US005585836A

United States Patent [19]

Pham et al.

[11] Patent Number: 5,585,836

[45] Date of Patent: Dec. 17, 1996

[54] ELECTROPHOTOGRAPHIC IMAGE RECORDING APPARATUS AND METHOD WITH CORRECTION FOR BOW IN PLACEMENT OF RECORDING ELEMENTS

[75] Inventors: Hieu T. Pham, Webster; Yee S. Ng, Fairport; Daniel C. Abbas, Webster, all of N.Y.

[73] Assignee: Eastman Kodak Company, Rochester, N.Y.

[21] Appl. No.: 174,942

[22] Filed: Dec. 27, 1993

[51] Int. Cl.[6] ................................ B41J 2/47; B41J 2/435; H01S 3/00; G01D 15/14

[52] U.S. Cl. ............................................ 347/237; 347/240

[58] Field of Search .................................... 347/237, 240, 347/247, 211, 168, 132, 118

[56] References Cited

U.S. PATENT DOCUMENTS

| | | | |
|---|---|---|---|
| 4,746,941 | 5/1988 | Pham et al. . | |
| 4,750,010 | 6/1988 | Ayers . | |
| 4,873,537 | 10/1989 | Ohta | 347/252 |
| 4,903,048 | 2/1990 | Harrington . | |
| 5,025,322 | 6/1991 | Ng | 347/237 |
| 5,040,003 | 8/1991 | Willis . | |
| 5,111,217 | 5/1992 | Zeise | 347/240 |
| 5,126,759 | 6/1992 | Small et al. . | |
| 5,200,765 | 4/1993 | Tai . | |
| 5,245,355 | 9/1993 | Morton | 347/118 |
| 5,255,013 | 10/1993 | Ng et al. . | |
| 5,274,394 | 12/1993 | Corona et al. . | |
| 5,410,414 | 4/1995 | Curry | 347/251 |

FOREIGN PATENT DOCUMENTS

WO91/10311 7/1991 WIPO .

*Primary Examiner*—Benjamin R. Fuller
*Assistant Examiner*—Thinh Nguyen
*Attorney, Agent, or Firm*—Norman Rushefsky

[57] ABSTRACT

A color image-forming apparatus comprises an electrophotoconductive imaging member moving in a first direction. A first corona charger forms an electrostatic charge on the imaging member. A first exposure device such as a laser or LED printhead imagewise modulates the electrostatic charge on an area of the member comprising an image frame. A first developer station develops a first visible image on the image frame with a pigmented toner of a first color. A second corona charger electrostatically charges the image frame having the visible image. A second exposure device such as a laser or LED device imagewise modulates the electrostatic charge on the image frame that was formed by the second charger. A second visible image is then formed on the image frame with a pigmented toner of a second color. The first and second visible images are transferred to a surface of a receiver sheet to form a two-colored image thereon. One of said first and second exposure devices is a raster printer that records rasterized lines of image data in a direction transverse to the first direction. The raster printing includes means for storing data representing bow error in printing of a raster line. Printing is done in response to image data and bow error data for recording substantially straight raster lines of image dam.

22 Claims, 9 Drawing Sheets

ELECTROPHOTOGRAPHIC IMAGE RECORDING APPARATUS AND METHOD WITH CORRECTION FOR BOW IN PLACEMENT OF RECORDING ELEMENTS

BACKGROUND OF THE INVENTION

1. Field of the Invention

This invention pertains to an electrophotographic image recording forming apparatus and method and, more particularly, to an image-recording apparatus and method for exposing an image-carrying member by electro-optic imaging devices.

2. Description Relative to the Prior Art

Apparatus for selectively removing electrostatic charge on an image-carrying member using LEDs or lasers in electrophotographic copiers or printers is well known.

In high speed LED (light-emitting diode) electrophotographic copiers or printers, several thousand LEDs are typically arranged in a row for recording on a suitable photoconductive web or drum. The overall length of all the LED arrays is as long as the width of the photoconductive web or dram. Driver circuitry are provided for selectively activating the LEDs to emit light to record in accordance with electronic data signals. In grey level LED printers such as disclosed in PCT Publication WO 91/10311 and U.S. Pat. No. 5,200,765 (the contents of both of which are incorporated herein by this reference), the data signals may be multibit digital signals for determining an exposure duration for recording each pixel. As also noted in the aforementioned publication and patent, the LEDs are known to be non-uniform light emitters relative to each other and correction is therefore desirable to overcome image degradation due to non-uniformities between the LEDs. One form of correction is adjustment Of pulsewidth duration for recording each pixel so that any two LEDs on the printhead, when each is enabled to record a latent image of a pixel of a desired density, will provide approximately identical densities even though the light output (intensity) from each is very different. The latent image is created on the photoconductor and then developed using conventional electrophotographic processes.

In addition to errors in LED non-uniformity correction, there are similar artifacts caused by improper placement of LEDs during assembly of the LEDs on the printhead. In assembly of the printheads, arrays of LEDs on semiconductor chips are positioned in a row. A row of plural LEDs on any one chip array will be uniformly spaced (pitched) apart at say 400 LEDs to the inch (15.75 per mm) due to the accuracy of the manufacturing process of such chips. Photolithography is typically used to fabricate the individual elements in an LED chip array. The placement of the individual LEDs within an array can thus be done with sub-micron accuracy; however, the semiconducting wafers used to produce LED chip arrays are available only in sizes of three inches (7.62 cm) in diameter or smaller. It is thus not possible to fabricate a one-piece LED array long enough to be used in printer/copiers, which typically have photoconductors that are eleven inches (27.94 cm) or more in width. Thus, LED array writers are fabricated by assembling shorter LED arrays, typically about a half-inch (27.94 cm) in length, into a twelve-inch (30.48 cm) or longer array by precision mechanical placement and bonding techniques.

The mechanical placement techniques cannot hold the same sub-micron tolerances that photolithography allows. The assembled LED array writer (see FIG. 1 ) thus typically consists of half-inch (1.27 cm) segments or chip arrays, A, with individual LEDs, L, precisely aligned with respect to each other, but the cumulative placement errors of the segments combine across the width on the writer with the result that some LEDs are displaced from a straight line connecting the two end elements by a substantial portion of the pixel width.

Another source of bow, which is often greater than that caused by the LED array placement errors, is created by nonuniformities in the graded index lens arrays, such as Selfoc lens arrays, commonly used to image the LED arrays onto the photoconductor. Such lens arrays are fabricated by bonding individual graded index optical fibers into an array, cutting the fibers to the appropriate length, and then polishing the ends. Because the index gradients of the individual fibers vary somewhat and the axes of the individual fibers are never perfectly aligned with respect to each other, the images of the LEDs on the photoconductor are typically displaced somewhat from each other. This optical source of bow thus results in misalignment of the images of the LEDs even within LED array segments. Thus, the images of pixels from the LEDs after focusing by a lens to the extent that such images depart from one straight line, are referred herein as "bow."

When only one writer is used in a printer, bow of a few pixel widths is generally not detectable; however, when two or more writers are used to expose the latent image for the same page, such as done for single pass or single frame color separations for color printing or for accent color, the bow can cause misregistration between the images written by the separate writers that is noticeable. Current best practice is to assemble the writers to as close a tolerance as can be justified by cost, and accept the misregistration that results. This misregistration is often several pixel heights in extent.

SUMMARY OF THE INVENTION

It is therefore an object of the invention to overcome the problem of bow and thus to provide for more precise placement of a line of recorded pixels across an imaging member. These and other objects are realized by a non-impact printer and method for recording, the printer comprising an imaging member moving in a first direction and adapted to form an image; raster printing means for imagewise modulating the imaging member with a raster line of pixels in a direction transverse to the first direction; and means responsive to bow error data for correcting bow in a raster line to form a generally straight raster line of pixels.

In accordance with another aspect of the invention, there is provided a color image-forming apparatus and method for recording comprising an electrophotoconductive imaging member moving in a first direction; a first charging means for forming an electrostatic charge on the imaging member; first exposure means for imagewise modulating the electrostatic charge on an area of the member comprising an image frame; first developer means for forming a first visible image on the image frame with a pigmented toner of a first color, second charging means for electrostatically charging the image frame having the visible image; second exposure means for imagewise modulating the electrostatic charge on the image frame that was formed by the second charging means; second developer means for forming a second visible image on the image frame with a pigmented toner of a second color, means for transferring the first and second visible images to a surface of a receiver sheet to form a two-colored image thereon; and wherein one of said first and second exposure means comprises raster printing means for recording rasterized lines of image data in a direction transverse to the first direction, said raster printing means including means for storing data representing bow error in printing of a raster line and said raster printing means is responsive to image data and bow error data for recording substantially straight raster lines of image data.

In accordance with a third aspect of the invention, there is a provided a non-impact printhead and method for recording, the printhead comprising a recording element; means for driving the recording element to record a pixel; first and second exposure clock counter means providing respectively different first and second exposure clock counts at their respective outputs; a first storage register means for storing a first multibit digital signal representing a pixel of data to be recorded; a second storage register means for storing a second multibit digital signal representing said same pixel to be recorded; first comparator means for comparing said first signal with said first exposure clock count and generating a first pulse-time period signal; second comparator means for comparing said second signal with said second exposure clock count and generating a second-pulse time period signal; third register means for storing a third signal related to bow correction; and fourth means responsive to said third signal to select an output of one of said first and second comparator means for enabling said driver means to activate said recording element for recording the pixel for a time period related to one of said first or second pulse-time periods and wherein said first and second pulse-time periods overlap in time only partially.

In accordance with a fourth aspect of the invention, there is provided a driver chip for Use in a non-impact printhead having a plurality of recording elements comprising a plurality of driver means each driver means including components forming a driver channel for driving a respective recording element; first and second exposure clock counter means providing respectively different first and second. exposure clock counts at their respective outputs; each driver channel including:

(a) a first storage register means for storing a first multibit digital signal representing a pixel of data to be recorded;

(b) a second storage register means for storing a second multibit digital signal representing said pixel to be recorded;

(c) first comparator means for comparing said first signal with said first exposure clock count and generating a first pulse-time period signal;

(d) second comparator means for comparing said second signal with said second exposure clock count and generating a second-pulse time period signal;

(e) third register means for storing a third signal related to bow correction; and (f) fourth means responsive to said third signal to select an output of one of said first and second comparator means for enabling said driver means to activate said recording element for recording the pixel for a time period related to one of said first or second pulse-time periods and wherein said first and second pulse-time periods overlap in time only partially.

BRIEF DESCRIPTION OF THE DRAWINGS

In the detailed description of the preferred embodiments of the invention presented below, reference is made to the accompanying drawings in which:

FIG. 2 is a schematic side illustration of an electrophotographic printer of the prior art and illustrating one embodiment of a prior an printer apparatus that the invention may be incorporated in;

DESCRIPTION OF THE PREFERRED EMBODIMENTS

The apparatus of the preferred embodiments will be described in accordance with an electrophotographic recording medium. The invention, however, is not limited to apparatus for creating images on such a medium, as other media such as photographic film etc. may also be used with the invention.

Because electrophotographic reproduction apparatus are well known, the present description will be directed in particular to elements forming part of or cooperating more directly with the present invention. Apparatus not specifically shown or described therein are selectable from those known in the prior art.

The invention can be used in a variety of electrophotographic applications. It will be described with regard to the electronic printer of FIG. 2.

In the prior art as represented by International Publication Number WO 90/01 730, and U.S. Pat. No. 5,040,003, images can be formed consecutively on the same image frame of a photoconductor without fixing the first image by the use of successive steps of charging, exposing and developing and then repeating such steps for each color to be created upon that image frame. The resulting multicolor image is then transferred to a receiving sheet in one step thereby increasing the productivity of the printer or the copier.

The exposure steps as taught in these publications are carried out using separate LED (light-emitting diode) printheads for each color to be formed. Typically, these printheads have a single row of several thousand LEDs arranged at say 300, 400 or 600 dots per inch (or equivalently 11.81, 15.75, 23.62 dots per mm, respectively) across the photoconductor and are controllably illuminated to modulate an electrostatic charge on the photoconductor to form images on a dot-by-dot or pixel-by-pixel basis.

A problem with the use of plural LED printheads is their relative alignment to each other so that image recorded colored pixels are appropriately formed in a desired pattern, i.e., that they are registered. In view of the small spacing between LEDs on a printhead,incorrect location of the printhead will cause images to be misregistered thereby affecting color and quality of the resulting image. To this end, expensive mechanical means may be devised to ensure that one printhead is accurately located relative to another but as this raises considerable costs to the manufacture of a printer apparatus, the invention described in aforementioned in U.S. Pat. No. 5,040,003 may be used to correct for this type of misregistration in the cross-track direction.

Figure 1:
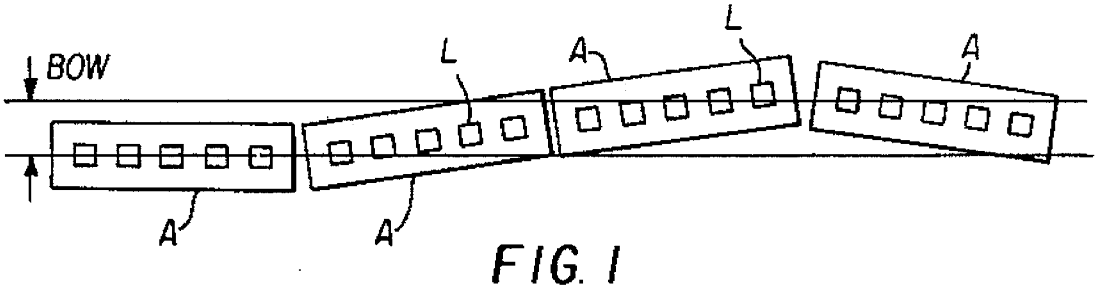
FIG. 1 (prior art)
FIG. 1 is an illustration of a schematic of an LED array comprised of an assembly of LED chip arrays arranged on an LED printhead as known in the prior art but illustrated in a grossly exaggerated fashion to facilitate understanding of the concept of bow displacement.
Figure 2:
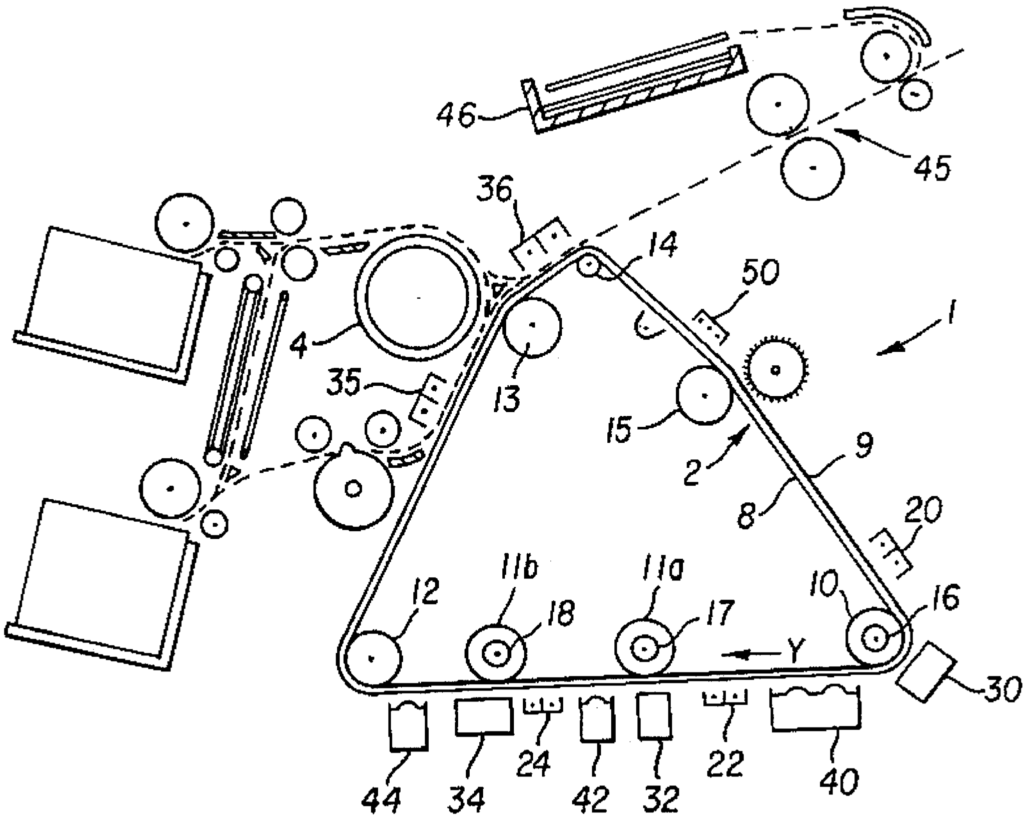
FIG. 2 (prior art)

According to FIG. 2, an electronic printer 1 includes a photoconductive member, for example, photoconductive web 2 entrained about a series of rollers 10, 11*a*, 11*b*, 12, 13, 14 and 15. The photoconductive web 2 is a multilayer structure which can take various forms, but is commonly a photoconductive layer 9 on a conductive backing 8 with a suitable support. The web 2 is driven by one of the rollers at a constant velocity through operative relationship with a series of electrophotographic stations.

A first charging station 20 imparts a uniform charge to an image area of the photoconductive surface on the web 2 which charge may be of either polarity depending on the characteristics of the photoconductive web. The uniformly charged image area is then exposed at a first electronic exposure station 30 to dissipate the charge creating a first electrostatic image. The electronic exposure station 30 converts electrical signals into a light image, and is preferably an LED printhead. The first electrostatic image is toned at a first development station 40 by the application of finely divided marking particles which are charged to the same polarity as the original charge placed on the web by first charging station 20 to thereby tone the areas of the web that are discharged by exposure at the first electronic exposing station 30 to create a first toner image of a first color, for example, black.

The same image area of the web then passes into operative relation with a second charging station 22 which essentially repeats the process of the first charging station, uniformly charging the web to a polarity the same as the polarity imparted by first charging station 20. The uniformly charged photoconductive member 2 is now imagewise exposed at second electronic exposure station 32 to create a second electrostatic image by imagewise discharging the photoconductor. The second electrostatic image is then toned at a second development station 42 by the application again of finely-divided toner of a second color having a charge the same as the uniform charge placed on the photoconductive member at the second charging station 22 to create a second toner image of a second color, for example, red.

The multicolor image is then transferred to a copy sheet at first transfer station 35. In the preferred embodiment shown in FIG. 2, the same process is repeated for the next image frame resulting in another multicolor toner image. For duplex copying, the copy sheet is inverted using a turn-around dram 4 and the second multicolor toner image is transferred to the side opposite that receiving the first multicolor toner image at a second transfer station 36. The copy sheet is then fed without disturbing the toner images to a fuser 45 which fixes both images to the copy sheet simultaneously. The copy sheet is then fed to an output tray 46. This particular duplexing mechanism is well known for monocolor reproduction, see for example, U.S. Pat. No. 4,191,465.

In the apparatus described in FIG. 2, two or three color images are produced at the same rate as monocolor images. Registration need only be accomplished between the exposing stations 30, 32 and 34. The sophistication of that registration depends on the requirements of the system. To obtain the most accurate registration, encoders 16, 17 and 18 are attached to rollers 10, 11*a* and 11*b*, which encoders assure the accuracy of placement of electronically controlled exposures by exposure stations 30, 32 and 34.

After the copy sheet has left the web to go to the fuser 45, the photoconductive member 2 is cleaned at cleaning station 50 for reuse, as is well known in the art.

Obviously, if a two-color system alone is desired for a particular apparatus, a third charging station 24, exposure station 34 and toning station 44 can be eliminated. Two-color systems have particular application to high speed printers in which the primary mode of operation is monocolor; i.e., black and the second color, usually red or blue is used to highlight certain passages of text or give a flair to letterheads, logos and the like. In such apparatus, the first development station 40 or the second station 42 can be a larger, heavier duty development station than the other station. A two-color system which provides a mixture of the colors by placement of pixels of different color adjacent to each other in various combinations is disclosed in U.S. Pat. No. 4,903,048.

As noted above and with reference to FIG. 3, the apparatus for the herein disclosed invention is typified by a printhead 120 constructed generally in accordance with an arrangement of elements as illustrated in U.S. Pat. No. 5,126,759 and comprised of a linear array of several thousand triggerable recording elements; e.g. LEDs, that are disposed to expose selectively the photosensitive image-receiver medium 2 that is movable relative to the array. Optical means for focusing the LEDs onto the medium may also be provided. In this regard, gradient index optical fiber devices such as Selfoc (trademark of Nippon Sheet Glass Co., Ltd.) arrays are highly suited. The LEDs of the array are triggered into operation by means of image processing electronics that are responsive to image signal information. Depending on the duration for which any given LED is turned on, the exposure effected by such LED is more or less made. Where the medium is, say, photographic film the latent image formed line by line by selective exposure of said LEDs may be subsequently developed by conventional means to form a visible image. Where the medium is an electrophotographic receptor as, for example, described above the LEDs may be used to form an electrostatic image on a uniformly electrostatically charged photoconductor and this image developed using opaque toner particles and transferred to a copy sheet.

As is well known, the LEDs 130 are alternately divided into odd and even-numbered LEDs so that respective integrated circuit driver chips 140 therefore are located on opposite sides of the line of LEDs. Also, as noted above, the LEDs are formed on semiconductor integrated circuit chip arrays 131 each having say 128 LEDs accurately aligned in a row at a nominal spacing of say 600 dots per inch (23.62 per mm). One half of the arrays on each chip are driven by a corresponding driver chip, so that two driver chips 140 are located on opposite sides of each LED array 131. Details of each driver chip made in accordance with the invention will be described with reference to FIG. 5. The driver chips 140 and LED arrays 131 are mounted upon a suitable support. As noted above, in mounting the LED chip arrays, difficulty is encountered in having these LED arrays aligned properly relative to each other and it is to this problem and the problem of the relative displacement of the images of the LEDs that the invention is addressed.

Figure 4:
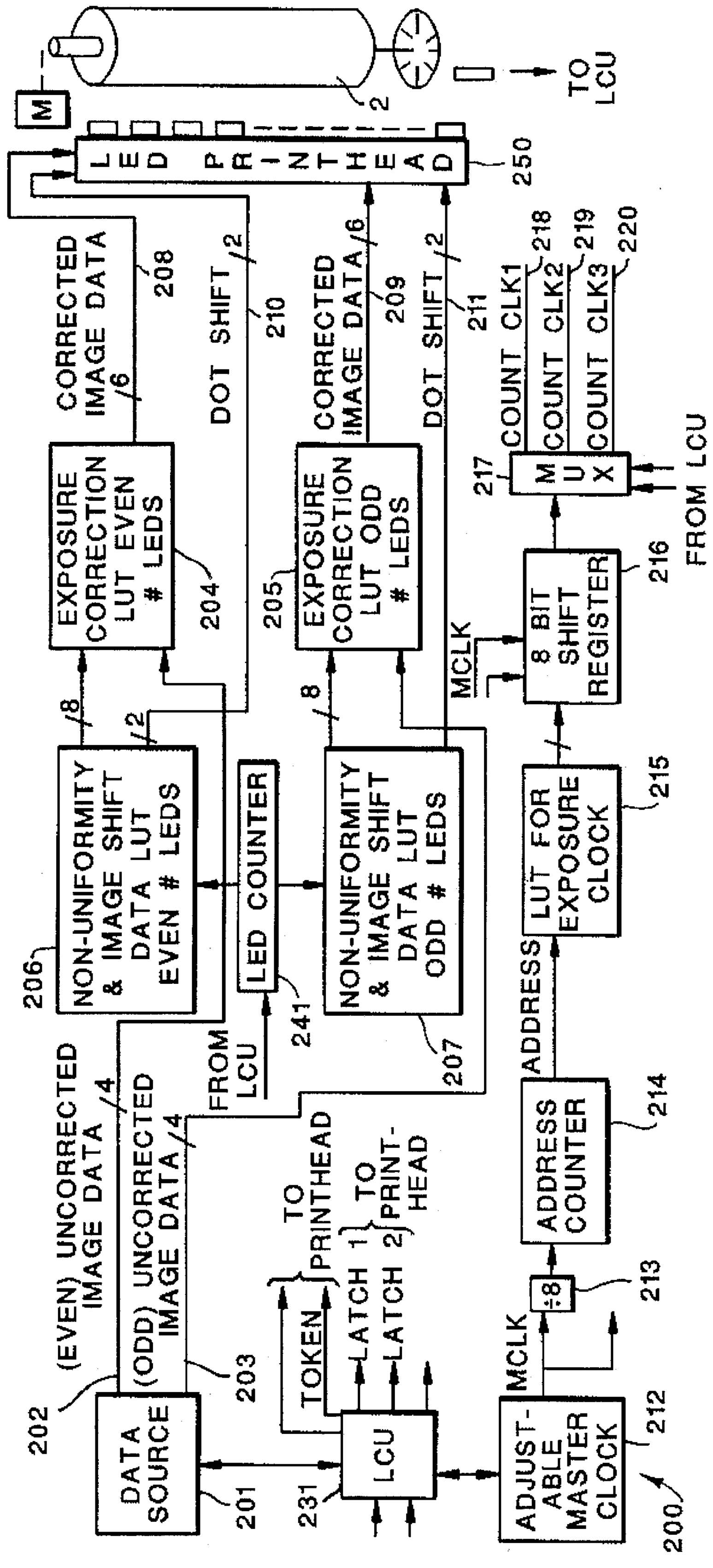
FIG. 4 is a block diagram of a circuit for providing signals to an improved printhead made in accordance with the invention.

With reference now to the circuit 200 of FIG. 4, a data source 201 provides rasterized image signals of say 4-bits per pixel density gradation. The data source may comprise a raster image processor that receives data from a computer or may be an image scanner, facsimile device or other source of image data which receives rasterized data from say scanning of an original document. In this example, assume that the printer apparatus of FIG. 2 is provided with say two LED printheads for two-color reproduction; i.e., black and one other color, and that the circuitry illustrated in FIG. 4 supports and processes data to one of the printheads while the other has its own support circuitry for processing data from the same data source 201. As will be described later preferably the printhead to be provided with bow correction is the LED printhead that is to provide the color exposure; i.e., non-black exposure.

Figure 3:
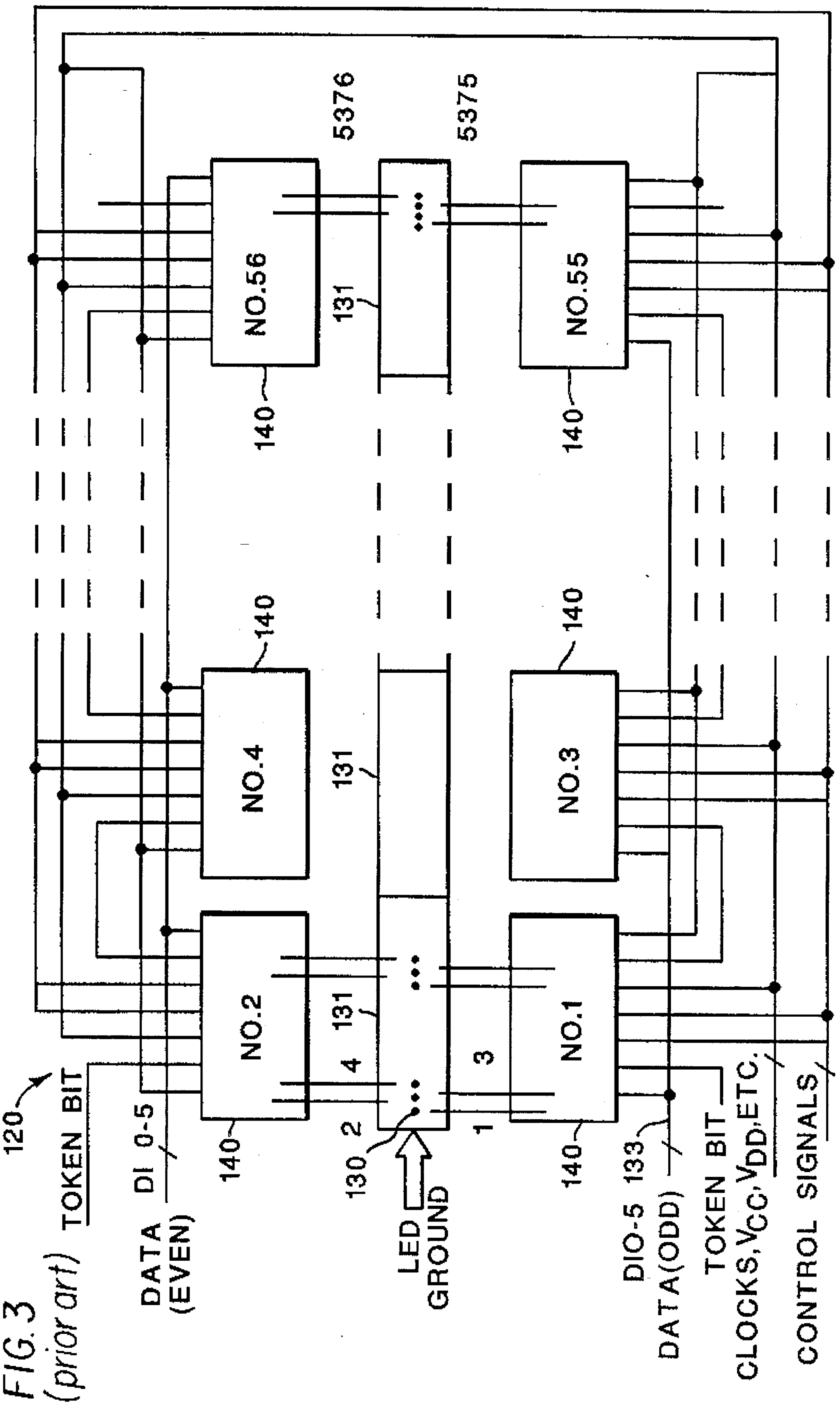
FIG. 3 (prior art)
FIG. 3 is a schematic of a prior art printhead suitable for use in the printer of FIG. 2 and illustrating a general arrangement of LED arrays and integrated circuit driver chips for driving the LEDs.

The data source 201 is synchronized for operation by the marking engines logic and control unit (LCU) 231 which receives signals relative to movement of the photoconductor from an encoder device, as is well known. Thus, the data source provides simultaneously 4-bit uncorrected image data for each odd and even-pixel pixel on respective image data buses 202, 203. This image data is input as an address input to exposure correction look-up tables 204, 205. An additional six-bit address input to these tables is output by separate look-up tables (206, 207) that provide non-uniformity and image shift data. As discussed above, the LEDs tend to vary in uniformity of light output due to differences between the LEDs resulting from their fabrication, differences in their driver currents and differences in how light is imaged by their respective Selfoc lens elements. Such differences can be adequately compensated for by adjusting the pulsewidth duration in accordance with techniques described in aforementioned U.S. Pat. No. 5,200,765. These differences in light output are detected by a sensor that is used in measuring the light output of each LED for each grey level (1–15 for 4-bits per pixel) and in determining an appropriate pulse duration that defines an exposure duration period that corrects each LED so that at each grey level, each LED will provide approximately the same amount of exposure in recording of a respective pixel. In the look-up tables 206, 207, there may be grouped those recording elements having similar intensity characteristics as well as similar needs for bow correction. Thus, in sensing the light output from each LED, the sensor may be moved not only in a direction parallel to the length or nominal longitudinal direction of the printhead but also in a direction transverse to this longitudinal direction to a position where it receives maximum light output from each LED after the light is focused by the Selfoc lens. This position may be sensed and used to define a measure of the distance from the nominal center line of the row of LEDs as well as to characterize the brightness intensity for each LED. Alternatively, the distance from the nominal center line for each LED may be determined by examining a line of simultaneously recorded pixels where no image shifting has been done. Assuming that the amount of image shift for each LED is determined, such information is stored in look-up tables 206, 207 (LUTs) that can be addressed by the number of the LED. The LEDs may be assigned a number in accordance with their order from one side of the printhead. Thus, as shown in FIG. 3 the 5376 LEDs can be assigned numbers 1 through 5376, but it is preferred to assign them numbers 0–2687, odd or even. Thus in this example there are identical numbers of odd and even LEDs and each such odd and even LED is assigned a number in a count. As data therefor is simultaneously provided for each successive odd and even pixel, the count in the counter 241 is incremented by the LCU to identify the odd and even LED associated with the respective image data. This count is input to the look-up tables 206, 207 as an address and the outputs from these tables, respectively, representing an 8-bit signal indicative of intensity characteristic for that LED and a two-bit signal indicative of image shift information for that LED. The 8-bit signal indicative of intensity characteristic is input as the second part of the address input to the exposure correction LUTs 204, 205 along with the 4-bit grey level rasterized image data signal. In response to these two address inputs, and for each pixel to be recorded, a six-bit corrected image data signal is output to the printhead on lines 208,209 along with the two-bit dot shift signals on lines 210, 211. Note that the two-bit signal for each LED or pixel to be recorded is used to define 1. those LEDs that are closest to the imaginary reference line; 2. those LEDs that are further from the reference line and 3. those LEDs that are furthest from the reference line. Two bits are sufficient to identify a pixel as being in one of these three categories.

Also, output are a series of exposure clock pulses for controlling the respective exposure during each of these exposure periods for a respective three pixel recording periods occurring during each raster line period defined in this example as 1/600 inches ($4.23\times10^{-2}$ mm) of movement of the photoconductor where the LEDs are spaced 600 dots to the inch (23.62 dots to the mm) to provide a 600×600 dots per inch squared recording resolution. Generally, where a plurality of recording elements are provided and arranged in a row for recording a rasterized line of image data, the number N of recording elements per unit dimension determines a recording resolution of N×N dots per square unit dimension. Thus, it can be said them are N regular raster lines per unit dimension and sub-raster printing relates to printing between regular raster lines.

As shown in FIG. 4, an adjustable master clock 212 is provided for outputting a series of primary high frequency clock pulses of say 40 MHz. The frequency may be adjusted for say color or process conditions but once determined, is fixed for the particular process condition. The clock pulses are output to a divide-by-8 divider 213 which puts a series of secondary clock pulses at one-eighth the frequency of that provided by the master clock 212. These secondary clock pulses are input to an address counter 214.

The address counter 214 counts the secondary clock pulses and outputs this as a count to a look-up table memory 215 which stores eight-bit bytes or digital data representing exposure clock pulses. The eight-bit byte data is shifted out in parallel to a parallel-in serial-out shift register 216. In response to clock pulses from the master clock, the digital data in serial register 216 is shifted out to multiplexer 217. In response to gating pulses from the LCU 231, an appropriate clock signal is sent to the printhead 250 on one of three lines 218–220 COUNTCLK 1, COUNTCLK 2 and COUNTCLK 3. For example, the multiplexer 217 switches between COUNTCLK 1 and COUNTCLK 3 during an initial part of a pixel line recording period (since a portion of a prior pixel line may overlap as discussed below) then switches back and forth between COUNTCLK lines 1 and 2 and then switches to an output on COUNTCLK line 2 and then to an output on COUNTCLK lines 2 and 3. Since the contents of register 216 represents either digital 0's or 1's, the output on line 218 comprises digital 0's and 1's wherein the 1's are selectively located so as to be shifted out when an exposure clock pulse rising edge is required on line 218. Exposure clock pulses are similarly output at regulated intervals on lines 219 and 220. The clock pulses on each line 218–220 are nonlinear in time; see referenced publication WO 91/10311. Also, reference is made to Johnson et al, "Random Timing Generator," IBM Technical Disclosure Bulletin, Vol. 12, No. 4, September 1969, page 614 for details regarding generation of timing pulses on multiple lines and to commonly assigned U.S. patent application Ser. No. 07/807,522 in the names of Kelly et al. The details of generating of different sets of exposure clock pulses as described herein are exemplary and other circuits may be provided for providing such pulses that will be apparent to those skilled in the art.

Figure 5:
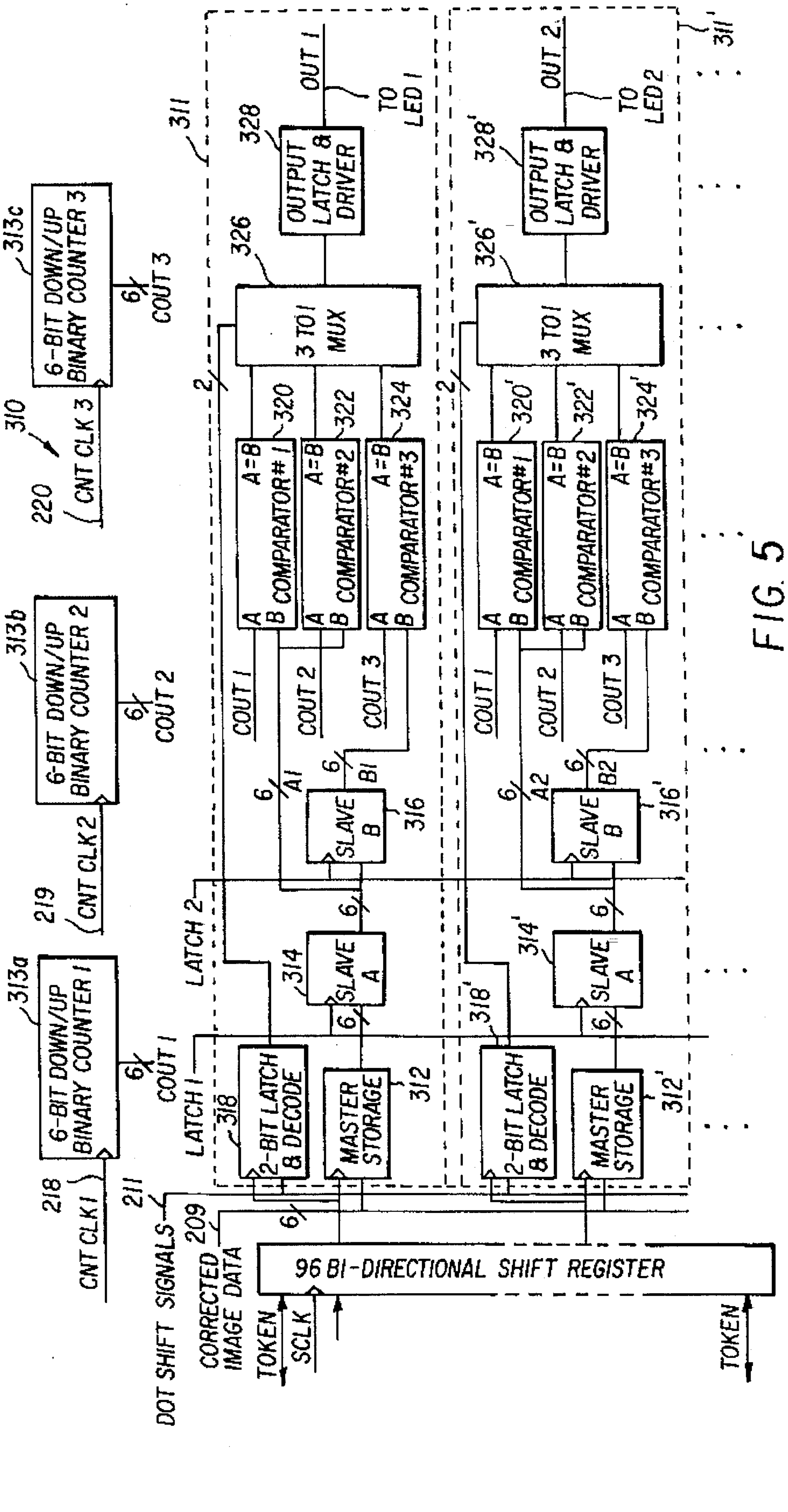
FIG. 5 is a block diagram of a circuit forming part of an integrated circuit driver chip and supported on the improved printhead of the invention.
Figure 6:
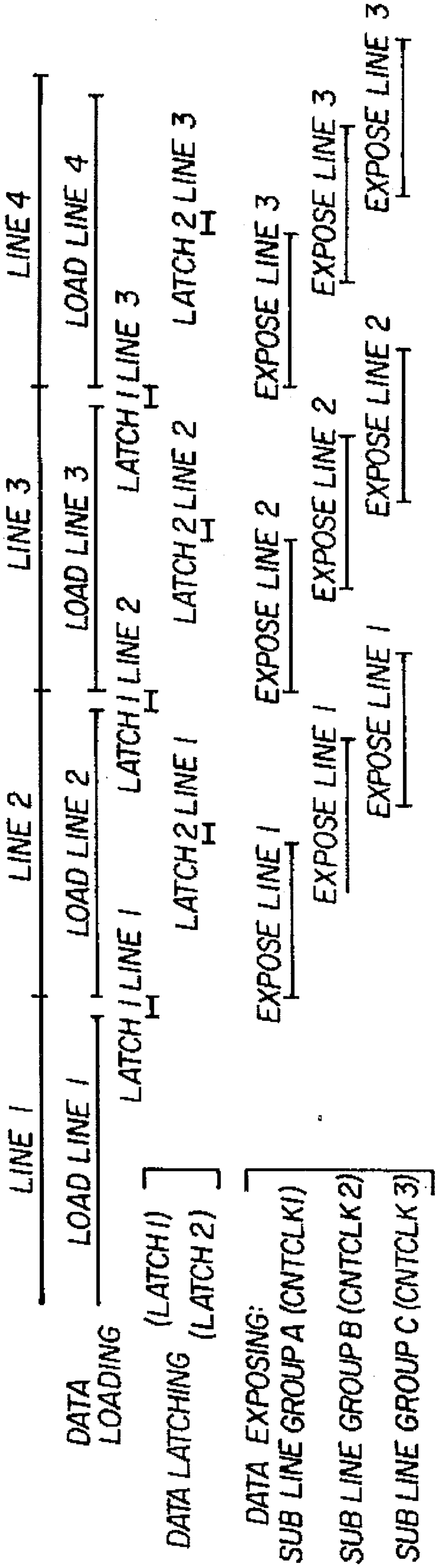
FIG. 6 is a timing chart illustrating a sequence for data loading and exposure sequencing on the improved printhead of the invention.

With reference now to FIG. 5 and 6, a functional block diagram of a portion of an integrated circuit driver chip 310 supported on the printhead 250 of the invention is provided. Background information as to control of exposure times for recording pixels using pulsewidth modulated LEDs is provided in aforementioned PCT Publication WO 91/10311 and U.S. Pat. No. 5,126,759, the contents of which are incorporated by reference. As shown in FIG. 5, there are three 6-bit down-up counters 313*a*, 313*b*, 313*c* (for the whole driver chip). Each channel 311 of the LED driver chip for driving a respective LED has the following circuits: a 6-bit master storage register 312, a 6-bit slave A storage register 314, a 6-bit slave B storage register 316, a 2-bit latch storage register 318 to store the bow parameter for each pixel, three 6-bit comparators 320, 322, 324, a 3-to-1 multiplexer 326 and an output latch/driver 328. One additional channel 311' is also illustrated and a prime is used to indicate identical circuits in channel 311'. Numerous other similar channels are provided on each driver chip for driving other LEDs, for example, driver chip 310 may have 64 channels for driving 64 LEDs where, for example, two driver chips are used to drive LEDs on an LED chip array having 128 LEDs.

With reference also to FIG. 4, signals (not shown) are used to load the settings for the driver output current. Bow parameter data is transmitted to the printhead over lines 209, 211 and latched into the latch registers 318, 318', etc. via a token bit signal. Corrected multibit image data on one of lines 208,209 are loaded into the master storage registers 312, 312' etc. via a shift clock signal (SCLK) and token bit signals in accordance with the loading techniques described in U.S. Pat. Nos. 5,126,759 and 4,746,941. After the data loading for a given line of pixels to be recorded is completed, signal Latch 1 is used to transfer this set of data to the first slave storage register 314, Slave A, and thereafter signal Latch 2 is used to transfer this set of data from Slave A to the second slave storage register 316, Slave B. The driver chip is ready to accept another set of data for the next line into the master storage registers 312, 312' etc. and the current set of data in Slaves A and B is ready to be recorded. The exposure time of a given pixel begins when the counter clock begins pulsing down from a count of 63.

As known generally in the art cited herein, a six-bit binary down-up counter is used to count clock pulses. Initially, the exposure clock pulse counter output is set at 63 and the counter is in a count-down mode. The counter's output decrements by one for each exposure clock pulse (CNTCLK) detected at its input until the output reaches 0. At that point, it switches to an up-count mode and increments by one for each exposure clock pulse detected at its input to a count of 63 at which point it is reset. Also as known generally in the art cited herein, a comparator receives the output of the down/up counter and controls a time duration of driver current to an LED by comparing the counter output to the value of the six-bit corrected image dam signal. This driver current to the LED commences when the counter output in the count-down mode equals or is just less than the value of the corrected image data signal and driver current is maintained until the output of the counter output in the up-count mode equals or is just greater than the value of the six-bit corrected image data signal.

The exposure time for each pixel is normally restricted to 50% of the line time to minimize the intrack dot overlapping to preserve the image sharpness. Thus, only two slave storages registers, Slave A and Slave B are needed to store data of the current line for the upcoming exposing cycle. Slave A storage register 314 will be strobed with the Latch 1 signal, as soon as the data loading of the current line into the master storage registers is complete. Slave B storage register 316 will be thereafter strobed with the Latch 2 signal halfway into printing of the current line of data. Since there are three independent counters 313*a, b, c* in each driver chip, and the period of each line is divided into three equal sub-line intervals, the exposure time for each channel can be started at the beginning or at the ⅓ or ⅔ marks of a line. Comparator #1 (320) will be comparing the output of counter #1 (313*a*) against the content of slave A. Comparator #2 (322) will be comparing the output of counter #2 (313*b*) against the content of Slave A (the comparisons at Comparators 1 and 2 will be over before the current line expires). Comparator #3 (324) will be comparing the output of counter #3 (313*c*) against the content of Slave B (Slave B is used because this comparison will be going on past the current pixel recording line, into the next line). The content of the 2-bit bow parameter storage latch 318 will be used to control the multiplexer 326 so that it selects one of the three Comparator outputs at its input to enable the output latch at driver 328 which provides a controlled amount of current to the respective LED 1 for a time duration determined by the selected comparator output. For example, a value 00 will select comparator output #1, values 01 and 10 will select comparator outputs #2 and #3, respectively. Assuming that the starting times for the three CNTCLK signals (CNTCLK1, CNTCLK2 and CNTCLK 3) are at the beginning, the ⅓ mark and the ⅔ mark of the upcoming current pixel line recording period, the starting time of a particular LED will be one of the three choices stated above. Thus, the latent image of an LED printhead is electronically shifted to compensate for the bow induced by mechanical assembly and/or by the imaging lens. The resolution of shifting using the above-described method is ⅓ of the intrack printing pitch (assuming the starting times of CNTCLK 1, 2 and 3 are spaced equally apart).

For the case when the bow of the printhead is more than the intrack pitch, the printhead can be divided into segments such that the bow within each segment is equal to the intrack pitch. We can apply the method described above to compensate for the bow within a given segment. The bows from segment to segment can be reduced by using the method described below. The above discussion is for the case of three sub-line intervals. This concept is applicable to other number of sub-line intervals (2, 3, 4, . . . ). Moreover, the sub-line intervals do not have to be equally separated. The more sub-line intervals there are, the finer the resolution of bow correction one can achieve and more hardware will be required. The number of counters and comparator needed will be the same as the number of sub-line intervals one desires. The size of the multiplexer will reflect the number of sub-line intervals, i.e. 2 to 1 mux. or 3 to 1 mux., or 4 to 1 mux. . . . . The bow parameter storage size will be the log (base 2) of the number of sub-line intervals, i.e. the number of bits of the bow parameter storage for each channel is log 2(n), rounding up to the next bigger integer, where n is the number of sub-line intervals (n=2,3,4,5, . . . ) Finally, we only need two slave storages. Slave A and B regardless of the number of sub-line intervals desired. This is because the exposing cycle of a given line of data will never extend beyond the ending time of the next line. In fact, if the exposure time of the printing system can be shortened to 1/n of the pixel line-recording time, where n is the number of sub-line intervals; i.e., the exposure time is no longer than 33% of the line time for the three sub-line intervals case, then slave storage B is not needed at all because the exposing cycle of a given line of data will never extend beyond the ending time of that line.

If the data loading speed of the system is fast, or the line time is long compared with the loading time, rather than employing a writer with characteristics above, one can make use of multiple address gray level printing method with a 'conventional gray-scale writer' to correct for the bow in the writer. For example, assume that the bow error for the writer is known and the proper correction by rearranging the data is already done (i.e., a 600×600 dpi system is now changed to a higher resolution 600×1800 dpi system) then using the multiple address printing scheme (many sub-encoder lines are created from one main encoder line) one can transmit the higher addressability data to the gray level printhead and expose the film with the data as long as the main encoder line time is long compared with the data loading time for all of these sub-lines. Further simplification of the system without increasing the output buffer size of the multiple address printing system can be done if the bow data can be combined with the image data at the end (like a multiple retransmit system having some similarity to that shown in U.S. Pat. No. 5,255,013 using 6 bits for exposure data and other bits for bow data of which each sub-line is used to transmit the exposure data in a re-transmit system) before being sent to the writer.

A retransmit system that does not require formatting of the image data in the frame store memory so that it is modified for bow correction will now be described.

Figure 7:
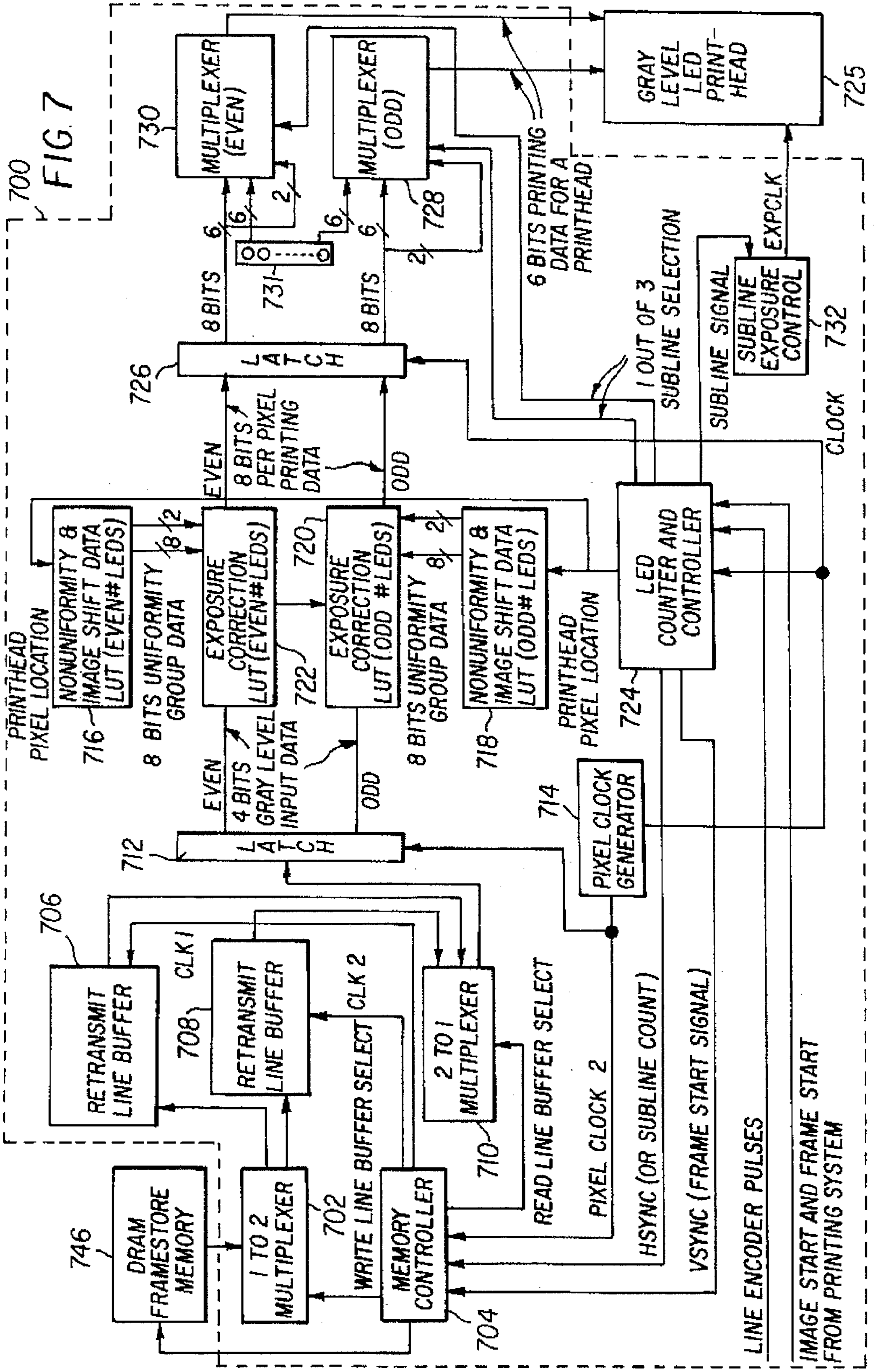
FIG. 7 is a circuit for generating signals to a known grey level printhead type of architecture and which corrects for bow in accordance with another embodiment of the invention.

With reference now to the embodiment 700 of FIG. 7, a memory controller 704 may be programmed to remove rasterized data from a page or framestore memory 746 by "pulling" two 8-bit words at a time representing grey level data for four pixels. This rasterized data represents device independent information in multibit digital form for each pixel. But where the image data is required to be modified to the specific printer, i.e. to make the image data "device dependent," further modifications to the data will be made as discussed below before sending same to the printer.

This data is stored in one of two re-transmit line buffers 706, 708 in response to signals from the memory controller 704. A multiplexer 702 controls which of the buffers is operative to store the particular line of pixel dam. Eventually, one line of pixel data is stored in the buffer, say buffer 706, and the next line of data is then stored in the other buffer 708. The storage of the data in each of the buffers, in this example, is such that they are in an order that they can be clocked out last pixel tint, i.e., the two 4-bit words for the last and the next to the last LEDs on the printhead are docked out first, while the two 4-bit words for the first and second LEDs of the printhead are docked out last. A second multiplexer 710 controls which of the line buffer outputs are to be transmitted to an 8-bit latch 712. Clock pulses (Clk1, Clk2) for clocking out the data from the buffers 706, 708 may be synchronized with the encoder of the printhead while the clock pulses for loading the data into the buffers are synchronized or controlled by a system clock. This approach allows data movement directly to the printhead in synchronization with the movement of the recording medium which may vary due to changes of speed; i.e., flutter etc. When the latch 712 receives the two 4-bit signals, it is then shifted to the output thereof wherein each 4-bit word provides an address in an exposure correction look-up memory table 720, 722. A further respective 8-bit address is provided to each look-up table 720, 722 by a uniformity look-up table 716, 718 which defines the brightness characteristic for the particular LED that is to print that particular pixel and an additional 2-bit signal defining image shift. Note in the example provided herein that odd and even pixel data are handled simultaneously with the data representing the adjacent odd and even pixels. A pixel clock generator 714 provides pulses to a counter and controller 724. The output of the counter 724 represents the pixel location of a particular pair of adjacent LEDs. The initial count may represent simultaneously the last odd and even LEDs. This count is then input into each of the two uniformity look-up tables 716, 718 which stores correction data for that particular LED of that pair as an 8bit word. The two 8-bit outputs of the two exposure correction lookup tables 720, 722 are then latched in latch 726.

The two 8-bit words latched by the latch 726 comprise two 6-bit image data words that are device dependent and represent the corrected exposure times for one odd and one even LED for recording a single grey level pixel by each and two 2-bit words that represent image shift for each such pixel; i.e., recording of each pixel during a particular recording of one of three subline recording periods. Each of the latched 8-bit words are output from the latch 726 to a respective multiplexer 728, 730 which uses the 2-bit words in conjunction with a signal from the controller 724 to determine whether or not to select the 6-bit data word for transmission to the printhead or an output of the 6-bits of null data from a null source 731. For each subline, a determination is made as to whether the 6-bit image data signal or the null signal is to be sent to the printhead by the multiplexers 728, 730, in accordance with a change in a respective 2-bit subline count signal from the counter and controller 724. For each subline, the re-transmit line buffer 706, 708 transmits the same line of data in 8-bit word increments (2-four bit words at a time) and this entire line of pixel data is transmitted three times with the grey level data for each pixel being corrected each time and transmitted to the latch 726.

Figure 10:
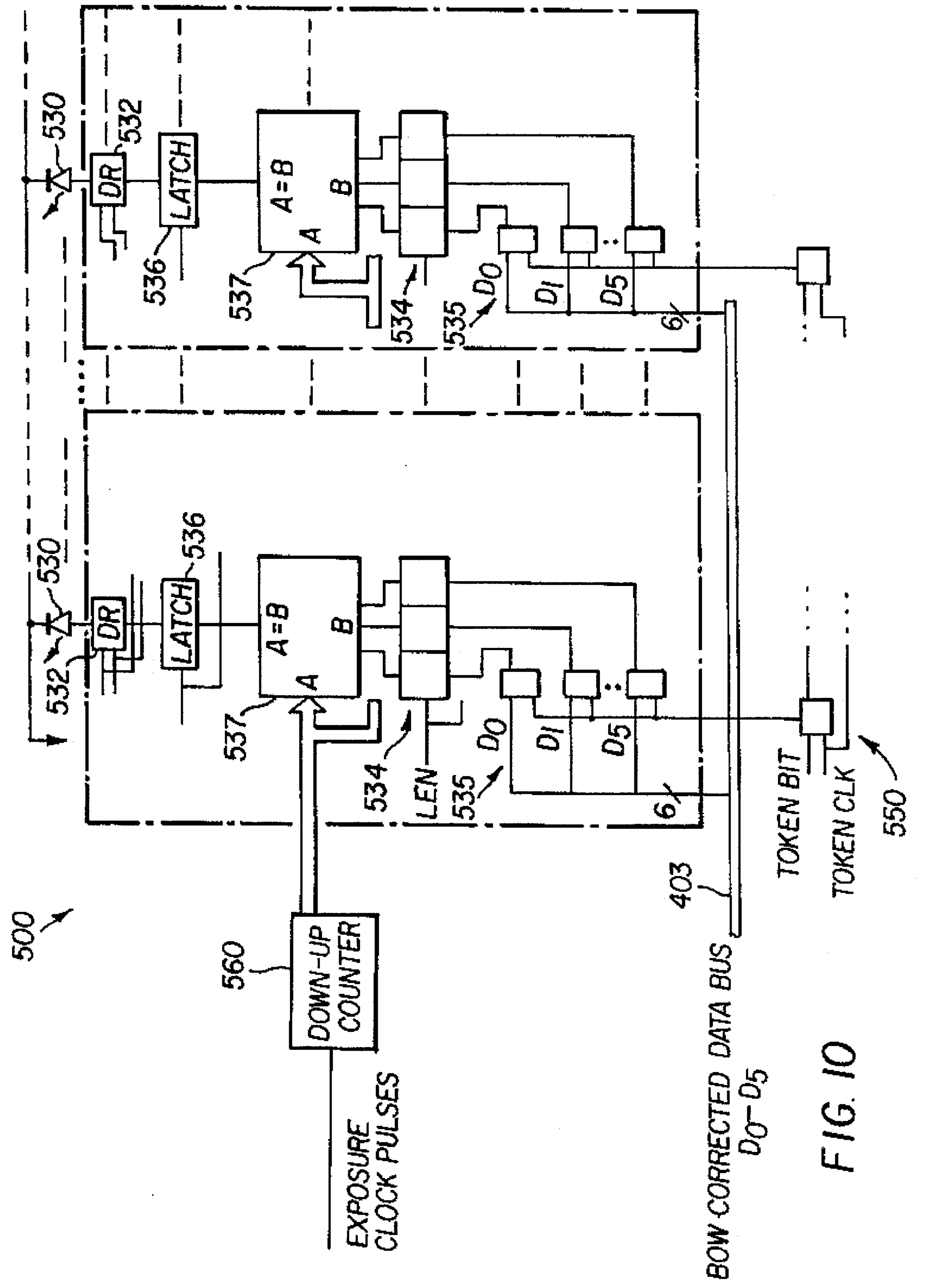
FIG. 10 is a schematic of a portion of a printhead of known architecture for use with the circuit of FIG. 9 to form an improved recording apparatus.

Each of the 6-bit image data signals selected during a predetermined subline recording period are output over respective image data buses for odd and even numbered pixels to a grey level LED printhead such as one, for example, having the architecture shown in FIG. 10 wherein there are three subline recording periods recorded during a mainline recording period. Thus, the corrected image data for each pixel is sent along the data bus with the data for any one pixel either being null data for two of the sublines and printable image data for the third. During each subline recording period, exposure clock pulses from exposure clock 732 are sent to the printhead along with a token bit signal and other control signals used for latching, etc. to cause the image data Or null data associated with that LED to be latched. Those LEDs that are to be enabled during the first sub-exposure pixel are exposed for a duration controlled by a comparator that has at its inputs the output of a down-up counter as described above as well as the respective image data signal. While image data for one subline recording period is being recorded, the image data for the next subline is sent over the respective corrected image data bus. In this example, the sub-exposure recording periods are each of one-third of a main-line recording period so that no overlap occurs. Therefore, one down-up counter per driver chip may be used and it goes through its down-up counting cycle three times during a main-line recording period, once for each subline recording period. Thus, a line of pixels may be recorded during the main-line recording period with correction for bow so that a relatively straight line in the cross-track direction is recorded. As an example where the LEDs are arranged in a row and have a nominal cross-track pitch between centers of 1/600" ($4.23\times10^{-2}$ mm) a main line recording period is nominally the time for the recording medium to move 1/600" and a subline recording period is nominally the time for the recording medium to move 1/1800" ($5.56\times10^{-4}$ mm).

Figure 8:
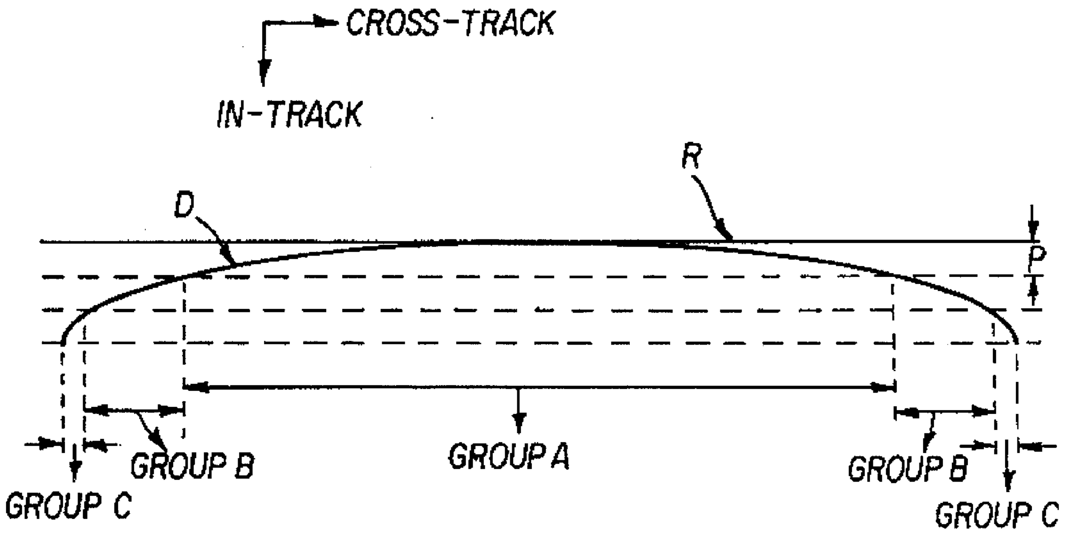
FIG. 8 is a schematic illustrating the problem of bow that is corrected in accordance with still another embodiment of the invention.
Figure 9:
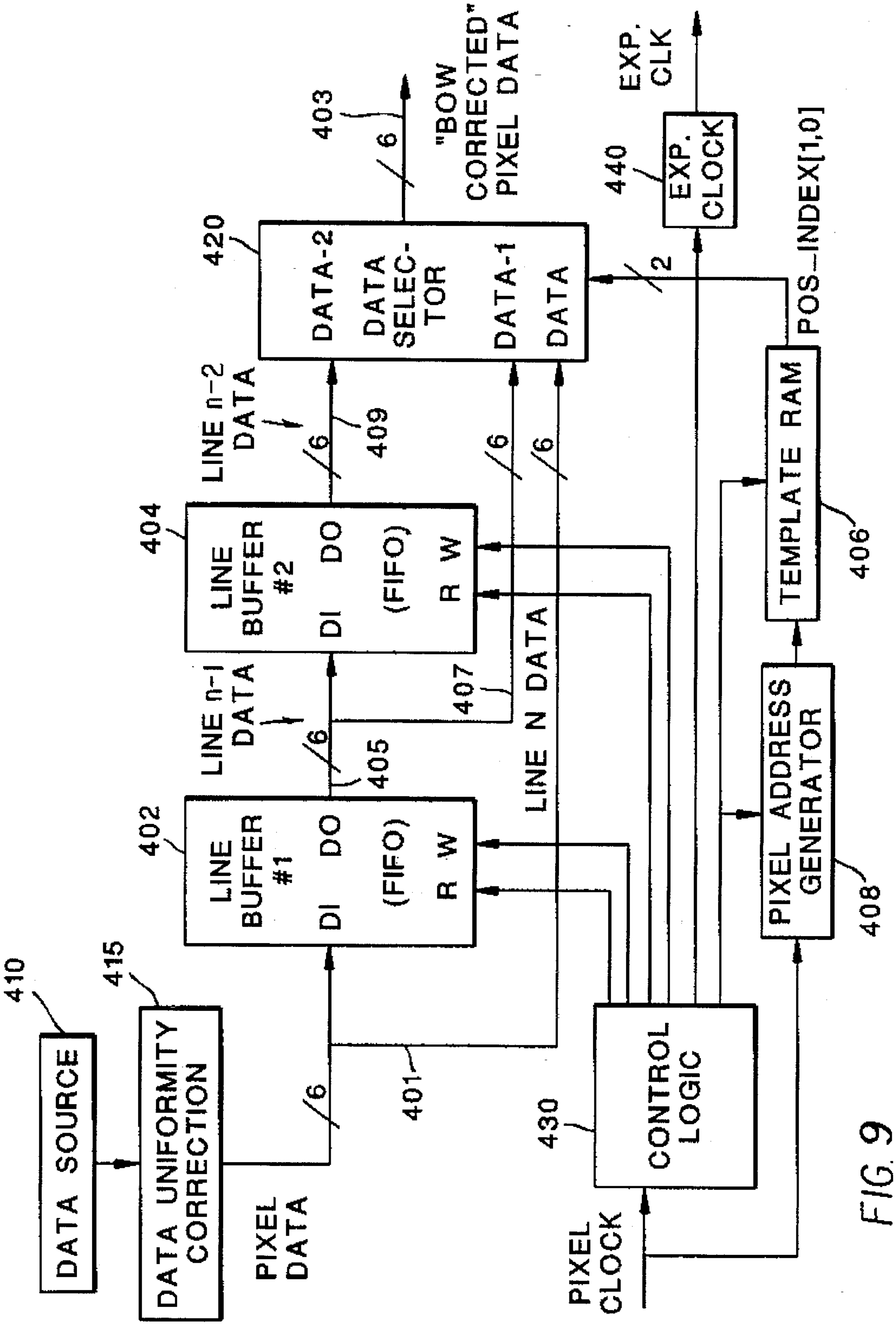
FIG. 9 is a circuit in accordance with the invention that is suited to the correction of the problem of bow as illustrated in FIG. 8.

There will now be described still another embodiment of a circuit that can be used to implement the invention. In this embodiment, gross errors in bow exceeding more than one pitch dimension are corrected for. In the following discussion, reference will be made with regard to the schematic of FIG. 8 wherein the line D represents a displacement of a recorded line of pixels from a straight reference line, R, that is an ideal pixel recording line that runs in the cross-track direction which is parallel to the row of recording elements (LEDs) in the printheads, assuming the elements are ideally located. The dashed lines in FIG. 8 represent ideal pixel recording line locations for previous pixel recording periods. If the cross-track pitch between the centers of the LEDs are 1/600" ($4.23\times10^{-2}$ mm), the distance between ideal pixel recording lines, P, may also be assumed to be 1/600". With reference now to FIG. 9 imaging data is generated by a data source 410 and modified by a uniformity correction circuit 415. The bow correction circuit 400, after receiving the imaging data for pixel recording line #1, stores this line of data at a Line Buffer #1, 402, and selectively sends line #1 data to group A's LEDs via lines 401,403 which can be seen from FIG. 8 to record pixels that are no more than one pitch dimension from an ideal location. Groups B and C's LEDs receive zeros as data to be used during recording of pixel line #1, the first raster line of pixels for this page or more precisely image frame being recorded. Group B's LEDs record pixels at more than one pitch dimension but less than two pitch dimensions from an ideal location. Group C's LEDs are found to record pixels at more than two pitch dimensions from an ideal location. These measurements are taken in the in-track direction. When the line #1 exposure cycle takes place, only group A's LEDs are on (at least those according to their respective image data that are to be turned on), the rest of the printhead's LEDs are off. When data for line #2 are available, they are sent to group A's LEDs via lines 401,403 and line buffer #1. The content of line buffer #1 (representing line #1 data) is then sent to line buffer #2, 404, and to group B's LEDs via lines 405,407 and 403. Group C's LEDs receive zeros as data. Thus, when line #2 exposure cycle takes place, group A's LEDs are on with line #2 data, group B's LEDs are on with line #1 data and group C's LEDs remain off. When data for line #3 are available, they are sent to group A's LEDs and line buffer #1. At the same time, the contents of line buffer #1 are sent to line buffer #2 and to group B's LEDs. Group C's LEDs receive data from line buffer #2 via lines 409, 403. Thus, when line #3 exposure cycle takes place, group A's LED are on with line #3 data, group B's LEDs are on with line #2 data and group C's LEDs are on with line #1 data. Thus, generally group A's LEDs are exposed with current line (line n) data, those of group B are exposed with line (n–1) data and those of group C are exposed with line (n–2) data. After the last line of a given frame has been sent, two additional lines with zero data are needed to complete the cycle. Using this correction scheme, the maximum bow error will be the line pitch or less. For 600 dpi printing applications, the maximum bow error will be 0.016" (42/μm) or less.

A FIFO is used as a line buffer because it allows simultaneous read and write operations. The FIFO size has to be slightly larger than the size of a line to allow for some overlapping in read and write operations. A bow-template RAM 406 (normally SRAM) is used to store the information on the bow characteristics of the printhead. If the printhead has 7500 LEDs and is divided into three groups as in the example above, then the size of the SRAM required will be 7500×2 bits. A host computer will load the template RAM with the printhead bow data prior to a printing operation. The Data Selector 420 is essentially a three-set-of-data to one-set-of-data multiplexer (each set of data can be six or eight bits). The multiplexer-control lines are the outputs of the template RAM. A logic control block 430 generates all control signals for the two line buffers and the template RAM circuitry. A pixel address generator 408 generates a signal identifying the address of a particular LED in the template RAM. The template RAM stores bow error data in the form of identifying whether that LED is to be enabled by line n data, line n–1 data or line n–2 data. This data is to be enabled by line n data, line n–1 data or line n–2 data. This data is output as a signal to data selector 420 which thereby selects the particular pixel data from the three available lines. Thus, the three lines of pixel data are combined by data selector to form a single line of pixel data in accordance with the bow error or correction data upon which the template is based. It also generates various signals required for synchronizing operation of the printhead and generation of exposure clock pulses such as non-linear clock pulses referred to in other embodiments described above and generated by exposure clock 440. Several such bow correction circuits can be used in parallel to accommodate a multifeed printhead for higher printing throughout where two, four or more data lines simultaneously send image data to the printhead.

With reference to FIG. 10, a grey level LED printhead 500 of known architecture is provided. The six bits per pixel bow corrected data is also uniformly corrected and transmitted on data bus 403 of the printhead. A token clock signal and token bit carried in token register 550 causes latching of the image data in six-bit data registers 535 associated with each LED drive channel. The contents of the latches are output from the registers in response to a latch enable signal (LEN) and latched in a latch register 534. The output of the latch register is input to one terminal B of a comparator 537 which compares the data signal with the output of a down-up counter 560 input to terminal A of the comparator. When there is a match between the signals at each terminal of the comparator, an enable signal is generated and latched on latch 536 to cause current driver 532 to output a level of current to LED 530 for a duration controlled by the latched image data and the exposure clock pulse scheme.

It will be appreciated that the same circuit can be applied to a laser scanner without modification. The laser is scanned across the photoconductor, the image is developed, and the bow of the scan is determined. The appropriate corrections are stored in the bow-template RAM.

The major advantage of this embodiment of the invention over the prior art is that it reduces the bow from several pixel heights to at most one-half a pixel height. The registration achievable for single pass or single frame accent color or process color is thus greatly improved.

It is also an advantage of this invention that it is applicable to all types of digital writers, including thermal recorders, ink jet, etc. and is not specific to LED array writers or laser writers.

Another advantage of this invention is that it is modular, i.e., it can easily be included or omitted from a writer design. Standard writers can still be used for black printers. For single frame or single pass color applications, the correction circuit can be included to achieve improved color registration. The cost of the correction circuit would thus not have to be born by all printers in a product line.

The invention has been described in detail with particular reference to preferred embodiments thereof, but it will be understood that variations and modifications can be effected within the spirit and scope of the invention.

We claim:

1. A color image-forming apparatus comprising:

an electrophotoconductive imaging member moving in a first direction;

a first charging means for forming an electrostatic charge on the imaging member;

first exposure means for imagewise modulating the electrostatic charge on an area of the member comprising an image frame;

first developer means for forming a first visible image on the image frame with a pigmented toner of a first color;

second charging means for electrostatically charging the image frame having the visible image;

second exposure means for imagewise modulating the electrostatic charge on the image frame that was formed by the second charging means;

second developer means for forming a second visible image on the image frame with a pigmented toner of a second color;

means for transferring the first and second visible images to a surface of a receiver sheet to form a two-colored image thereon; and wherein one of said first and second exposure means comprises raster printing means for recording rasterized lines of image data in a direction transverse to the first direction, said raster printing means including means for storing data representing bow correction data in printing of a raster line and said raster printing means is responsive to raster image data and bow correction data for recording substantially straight raster lines of image data and wherein said raster printing means records the image data for a single line of raster image data in a plurality of sub-raster printing line-recording intervals with pixels in a raster line each being recorded during only one sub-raster printing line recording interval in response to bow correction data relating to a respective sub-raster printing line for recording a respective one of the pixels in the pixel recording line and wherein a substantially straight line of pixels is formed on said recording medium in recording of said line of raster image data;

and wherein said raster printing means includes a plurality of point-like recording elements and driver channel means, associated with each point-like recording element, for providing a current to generate a respective pixel; and each driver channel means includes:

(a) a first storage means for storing bow-correction data related to a raster sub-line for recording a pixel by the respective recording element;

(b) a second storage means for storing image data for recording the pixel by the respective recording element;

(c) plural comparator means for comparing the image data with exposure count signals and generating a comparator output signal;

(d) means responsive to said bow-correction data related to a raster sub-line for selecting an output from one of said comparators to generate a recording element enablement signal; and (e) means responsive to the recording element enablement signal to enable a respective recording element during a raster sub-line.

2. The apparatus of claim 1 and wherein said raster printing means includes a plurality of exposure clock counter means, each for counting different respective sets of exposure clock pulses and each of said plural comparator means is responsive to only one of said plural exposure clock counter means.

3. The apparatus of claim 2 and wherein said plural comparator means compare image data for recording during different sub-raster intervals and the sub-raster intervals overlap.

4. The apparatus of claim 3 and wherein the raster printing means includes means for correcting grey level image data for non-uniformities of the recording elements.

5. The apparatus of claim 4 and wherein said recording elements are light-emitting diodes.

6. A color image-forming apparatus comprising:

an electrophotoconductive imaging member moving in a first direction;

a first charging means for forming an electrostatic charge on the imaging member;

first exposure means for imagewise modulating the electrostatic charge on an area of the member comprising an image frame;

first developer means for forming a first visible image on the image frame with a pigmented toner of a first color;

second charging means for electrostatically charging the image frame having the visible image;

second exposure means for imagewise modulating the electrostatic charge on the image frame that was formed by the second charging means;

second developer means for forming a second visible image on the image frame with a pigmented toner of a second color;

means for transferring the first and second visible images to a surface of a receiver sheet to form a two-colored image thereon; and wherein one of said first and second exposure means comprises raster printing means for recording rasterized lines of image data in a direction transverse to the first direction, said raster printing means including means for storing data representing bow correction data in printing of a raster line and said raster printing means is responsive to raster image data and bow correction data for recording substantially straight raster lines of image data; and wherein said raster printing means records the image data for a single line of raster image data in a plurality of sub-raster printing line-recording intervals with pixels in a raster line each being recorded during only one sub-raster printing line recording interval in response to bow correction data relating to a respective sub-raster printing line for recording a respective one of the pixels in the pixel recording medium in recording of said line of raster image data; and wherein said raster printing means includes a retransmit line buffer means for transmitting plural times image data unmodified by bow correction data for recording a raster line of pixels.

7. A non-impact printhead for recording, the printhead comprising:

a recording element;

driver means for driving the recording element to record a pixel;

first and second exposure clock counter means providing respectively different first and second exposure clock counts at their respective outputs;

a first storage register means for storing a first multibit digital signal representing a pixel of data to be recorded;

a second storage register means for storing a second multibit digital signal representing said pixel to be recorded;

first comparator means for comparing said first signal with said first exposure clock count and generating a first pulse-time period signal;

second comparator means for comparing said second signal with said second exposure clock and generating a second-pulse time period signal;

third register means for storing a third signal related to bow correction; and fourth means responsive to said third signal to select an output of one of said first and second comparator means for enabling said driver means to activate said recording elements for recording the pixel for a time period related to one of said first or second pulse-time periods and wherein said first and second pulse-time periods overlap in time only partially.

8. The printhead of claim 7 and wherein the recording element is a laser.

9. The printhead of claim 7 and wherein there are a plurality of recording elements and driver means comprise separate driver channels for driving respective recording elements and each driver channel includes:

(a) a said first and a said second storage register means;

(b) a said first and a said second comparator means;

(c) a said third register means; and (d) a said fourth means.

10. The printhead of claim 7 in combination with a marking engine means for recording images on sheets, the marking engine means including an image recording member that is responsive to and cooperates with an output of the recording element for recording images.

11. A driver chip for use in a non-impact printhead having a plurality of recording elements comprising:

a plurality of driver means each driver means including components forming a driver channel for driving a respective recording element;

first and second exposure clock counter means providing respectively different first and second exposure clock counts at their respective outputs;

each driver channel including:

(a) a first storage register means for storing a first multibit digital signal representing a pixel of data to be recorded;

(b) a second storage register means for storing a second multibit digital signal representing said pixel to be recorded;

(c) first comparator means for comparing said first signal with said first exposure clock count and generating a first pulse-time period signal;

(d) second comparator means for comparing said second signal with said second exposure clock count and generating a second-pulse time period signal;

(e) third register means for storing a third signal related to bow correction; and (f) fourth means responsive to said third signal to select an output of one of said first and second comparator means for enabling said driver means to activate said recording element for recording the pixel for a time period related to one of said first or second pulse-time periods and wherein said first and second pulse-time periods overlap in time only partially.

12. A non-impact printer for recording, the printer comprising:

an imaging member moving in a first direction and adapted to form an image;

raster printing means for imagewise modulating the imaging member with a raster line of pixels in a direction transverse to the first direction, said raster printing means being responsive to bow correction data for correcting bow in a raster line to form a generally straight raster line of pixels and wherein said raster printing means is operative to record image data for a single line of raster image data in a plurality of sub-raster printing line-recording intervals with pixels in a raster line each being recorded during only one sub-raster printing line recording interval in response to bow correction data relating to a respective sub-raster printing line for recording a respective one of the pixels in the pixel recording line and wherein a substantially straight line of pixels is formed on said imaging member in recording of said line of raster image data, and wherein said raster printing means includes a plurality of point-like recording elements and driver channel means associated with each point-like recording element, for providing a current to generate a respective pixel; and each driver channel means includes:

(a) a first storage means for storing, in response to bow-correction information, data related to a raster sub-line for recording a pixel by the respective recording element;

(b) a second storage means for storing image data for recording the pixel by the respective recording element;

(c) plural comparator means for comparing the image data with exposure count signals and generating a comparator output signal;

(d) means responsive to said data related to a raster sub-line for selecting an output from one of said comparators to generate a recording element enablement signal; and (e) means responsive to the recording element enablement signal to enable a respective recording element during a sub-pixel recording line interval.

13. The printer of claim 12 and wherein said raster printing means includes a plurality of exposure clock counter means, each for counting different respective sets of exposure clock pulses and each or said plural comparator means is responsive to only one of said plural exposure clock counters and wherein said plural comparator means compare image data for recording during different sub-raster intervals and sub-raster intervals overlap.

14. The printer of claim 13 and wherein the raster printing means includes means for correcting grey level image data for non-uniformities of the recording elements.

15. A method of non-impact recording, the method comprising:

driving a recording element to record a pixel;

providing respectively different first and second exposure dock counts at respective outputs of first and second exposure clock counters;

storing a first multibit digital signal representing a pixel of data to be recorded;

storing a second multibit digital signal representing said pixel to be recorded;

comparing said first signal with said first exposure clock count and generating a first pulse-time period signal;

comparing said second signal with said second exposure clock count and generating a second-pulse time period signal;

storing a third signal related to bow correction; and in response to said third signal enabling said driver means to activate said recording element for recording the pixel for a time period related to one of said first or second pulse-time periods and wherein said first and second pulse-time periods overlap in time only partially.

16. The method of claim 15 in combination with recording images on sheets using a marking engine of which the recording element forms a part.

17. A non-impact printer apparatus comprising:

a plurality of recording elements arranged generally in a row in a mainscan direction, at least some of the elements having centers displaced in a subscan direction from a straight line passing through centers of others of said elements, the straight line extending in the main scan direction, and each of said elements which has a center displaced from said straight line being misregistered and displaced from the straight line by an amount representing a bow error;

means for providing data signals representing image data to be recorded by said recording elements;

means for generating respective first count signals to identify respective recording elements;

means responsive to said first count signals and to said data signals for generating corrected image data signals that include correction for nonuniformities in emission characteristics of the recording elements and dot shift signals for correcting bow errors;

first storage means associated with each recording elements for storing one of said corrected image data signals for recording a pixel;

second storage means associated with each recording element for storing one of said dot shift signals for use in controlling recording of said pixel;

a plurality of counting means for counting exposure clock pulses and generating respective exposure clock count signals in response to countings of exposure clock pulses;

means including a plurality of comparator means associated with each recording element and responsive to said one of said dot shift signals for comparing said exposure clock count signals with said one of said corrected image data signals for generating a control signal for controlling a recording parameter for recording a pixel; and means associated with each recording element and responsive to said control signal for enabling said recording element to record a pixel.

18. The apparatus of claim 17 and wherein said plurality of counting means includes first, second and third counting means, said plurality of comparator means includes first, second and third comparator means and for each recording element a first counting means is associated with a first comparator means and provides a first exposure clock count signal to said first comparator means, a second counting means is associated with a second counting means and provides a second exposure clock count signal to said second comparator means and a third counting means is associated with a third counting means and provides a third exposure clock count signal to said third comparator means and including means responsive to said one of said dot shift signals for selecting an output of one said first, second and third comparator means.

19. The apparatus of claim 18 and wherein said plurality of counting means being characterized such that a first subline exposure period represented by the first count signal output of said first counting means overlaps with a second subline exposure period represented by the second count signal output of said second counting means and a third subline exposure period represented by the third count signal output of said third counting means overlaps with said second subline, all with respect to a single main scan recording line period but said third subline recording period does not overlap with said first subline recording period.

20. The apparatus of claim 18 and including means for multiplexing exposure clock pulses to said plurality of counting means.

21. The apparatus of claim 18 and wherein said first storage means includes a master storage means for latching corrected image data from a first slave latch means that is slaved to said master storage means for receiving data from said master storage means, and a second slave latch means that is slaved to said first slave latch means for receiving the corrected image data from said first slave latch means, said first comparator means having a first input for receiving said first exposure clock count signal and a second input for receiving an output of said first slave latch means; said second comparator means having a first input for receiving said second exposure clock count signal and a second input for receiving said output of said first slave latch means, and said third comparator means having a first input for receiving said second exposure clock count signal and a second input for receiving an output of said second slave latch means.

22. The apparatus of claim 21 and including means for multiplexing exposure clock pulses to said plurality of counting means.

* * * * *